United States Patent
Borg et al.

(10) Patent No.: US 7,017,556 B2
(45) Date of Patent: Mar. 28, 2006

(54) ENGINE START FUEL CONTROL SYSTEM (75) Inventors: Jonathan Borg, Livonia, MI (US); Shigeru Oho, Farmington Hills, MI (US); Frank Warren Hunt, West Bloomfield, MI (US); Ayumu Miyajima, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 108 days.

(21) Appl. No.: 10/756,564

(22) Filed: Jan. 13, 2004

(65) Prior Publication Data
US 2005/0016503 A1 Jan. 27, 2005

Related U.S. Application Data

(63) Continuation-in-part of application No. 10/624,228, filed on Jul. 22, 2003.

(51) Int. Cl.
F02D 41/06 (2006.01)
(52) U.S. Cl. .................... 123/491; 123/179.3
(58) Field of Classification Search ............ 123/179.3, 123/543, 557, 491
See application file for complete search history.

(56) References Cited

U.S. PATENT DOCUMENTS

| | | | | |
|---|---|---|---|---|
| 5,022,357 A | * | 6/1991 | Kawamura ............... | 123/90.11 |
| 5,482,023 A | | 1/1996 | Hunt et al. .................. | 123/491 |
| 5,890,467 A | | 4/1999 | Romzek ..................... | 123/299 |
| 5,893,349 A | * | 4/1999 | Rado ....................... | 123/406.42 |
| 5,894,832 A | * | 4/1999 | Nogi et al. ................. | 123/491 |
| 6,016,789 A | | 1/2000 | Denz et al. ............. | 123/406.62 |
| 6,032,653 A | | 3/2000 | Anamoto .................... | 123/491 |
| 6,098,585 A | * | 8/2000 | Brehob et al. ........... | 123/179.5 |
| 6,253,145 B1 | | 6/2001 | Garrard et al. ............. | 701/105 |
| 6,305,348 B1 | | 10/2001 | Grosmougin et al. ....... | 123/299 |
| 6,389,806 B1 | | 5/2002 | Glugla et al. ............... | 123/697 |
| 6,404,188 B1 | | 6/2002 | Ricks ..................... | 324/207.22 |
| 6,431,129 B1 | * | 8/2002 | Hammoud et al. ...... | 123/90.15 |
| 6,453,864 B1 | * | 9/2002 | Downs et al. ............ | 123/179.3 |
| 6,481,405 B1 | * | 11/2002 | Fujino et al. ............. | 123/179.3 |
| 6,526,939 B1 | | 3/2003 | Reitz et al. .................. | 123/299 |
| 6,736,103 B1 | * | 5/2004 | Hunt et al. .................. | 123/299 |
| 6,772,723 B1 | * | 8/2004 | Aoki et al. ............... | 123/179.4 |
| 6,807,934 B1 | * | 10/2004 | Kataoka et al. .......... | 123/179.4 |

(Continued)

*Primary Examiner*—Henry C. Yuen
*Assistant Examiner*—Arnold Castro
(74) *Attorney, Agent, or Firm*—Gifford, Krass, Groh, Sprinkle, Anderson & Citkowski, P.C.

(57) ABSTRACT

An engine startup fuel control system for use with a four-cycle internal combustion engine of the type having a plurality of combustion chambers, an air intake passageway, a source of fuel, a crankshaft and a camshaft which operates the engine cylinder valves. A multipoint fuel injector is associated with each combustion chamber and each multipoint fuel injector has an inlet connected to the fuel source and an outlet connected to the air intake passageway adjacent its associated combustion chamber. A crankshaft position sensor generates an output signal representative of the angular position of the crankshaft while, similarly, a camshaft position sensor generates an output signal representative of the angular position of the camshaft. An engine control unit is programmed to determine the synchronization of the engine in response to the output signals from the crankshaft position sensor and camshaft position sensor. The engine control unit has outputs which control the activation of each multipoint fuel injector and is programmed to vary the activation of the multipoint fuel injector after determination of the engine synchronization in order to achieve a predetermined air/fuel mixture in each combustion chamber during engine startup.

18 Claims, 3 Drawing Sheets

U.S. PATENT DOCUMENTS

| | | |
|---|---|---|
| 6,834,632 B1 * | 12/2004 | Kataoka et al. .......... 123/179.4 |
| 6,871,617 B1 * | 3/2005 | Winstead et al. ........ 123/90.11 |
| 2001/0011536 A1 | 8/2001 | Nonomura et al. ......... 123/491 |
| 2002/0050265 A1 | 5/2002 | Yoshida et al. ............. 123/295 |
| 2003/0037607 A1 | 2/2003 | Minich et al. ............. 73/117.3 |
| 2003/0075152 A1 | 4/2003 | Joos et al. ............. 123/406.53 |
| 2003/0109981 A1 | 6/2003 | Bortolin ..................... 701/102 |
| 2004/0216719 A1 * | 11/2004 | Condemine et al. ... 123/406.47 |

\* cited by examiner

ENGINE START FUEL CONTROL SYSTEM

RELATED APPLICATION

This application is a continuation-in-part of U.S. patent application Ser. No. 10/624,228 filed Jul. 22, 2003, which is hereby incorporated herein by reference.

BACKGROUND OF THE INVENTION

I. Field of the Invention

The present invention relates generally to a fuel control system for internal combustion engines and, more particularly, to a fuel control system during an engine start condition.

II. Description of Related Art

Most modern day internal combustion engines of the type used in automotive vehicles are four-cycle engines having a plurality of internal combustion chambers. An intake manifold has one end open to the throttle and its other end open to the internal combustion chamber via the throttle intake valves. During a warm engine condition, a multipoint fuel injector associated with each of the internal combustion chambers provides fuel to its associated internal combustion chamber. The activation of each multipoint fuel injector is controlled by a processing circuit also known as an electronic control unit (ECU).

During the engine operation, pistons contained within the combustion chambers are drivingly connected to a crankshaft so that reciprocation of the pistons within their respective chambers rotatably drive the engine crankshaft. Similarly, during engine operation, an engine camshaft controls the operation, i.e. opening and closing, of the engine intake valves. A camshaft is also associated with the engine exhaust valves to enable the combustion products from the combustion chamber to be exhausted from the engine.

For a four-cycle internal combustion engine, each combustion chamber in the engine undergoes four cylinder strokes during one complete engine cycle. These strokes are the intake stroke in which a fuel/air mixture is inducted into the cylinder, a compression stroke in which the air/fuel mixture is compressed, a power stroke in which the air/fuel mixture is ignited, and an exhaust stroke in which the combustion products are exhausted from the engine cylinder. Furthermore, in a multiple combustion chamber engine of the type used in automotive engines, the individual cylinder strokes are staggered between the various combustion chambers.

Since the engine undergoes four engine strokes per complete engine cycle, each cylinder in each combustion chamber undergoes two reciprocations within its combustion chamber per engine cycle. Consequently, the crankshaft rotates at a rotational speed equal to twice the rotational speed of the camshaft. Additionally, when any piston is at top dead center in its associated combustion chamber, the engine cycle for that combustion chamber may be either immediately after the compression cycle or immediately after the exhaust cycle.

In order for the ECU to determine engine synchronization, i.e. the position and cycle of each combustion chamber in the engine, the previously known internal combustion engines have utilized both a crankshaft and camshaft position sensor. The crankshaft position sensor provides an output signal to the ECU representative of the angular position of the crankshaft while, similarly, the camshaft sensor provides an output signal representative of the angular position of the camshaft. Typically, a gear wheel having one or more missing teeth is secured to both the crankshaft as well as to the camshaft. A sensor then detects the absence of the tooth on the crankshaft gear wheel or camshaft gear wheel so that the sensors generate an output signal to the ECU. Furthermore, complete synchronization of the engine until an output signal from both the crankshaft sensor and the camshaft sensor, or the absence of an output signal from the camshaft sensor which would otherwise be expected, is received by the ECU.

Once synchronization is determined by the ECU, the ECU then generates the appropriate output signals to the multipoint fuel injectors, spark plugs, and the like in order to achieve the desired engine operation for the vehicle.

Although engine operation by the ECU during a steady state operating condition for the internal combustion engine is straightforward, special problems arise during an engine start condition. More specifically, during an engine start condition and during the synchronization period, i.e. before the ECU determines the position of the crankshaft and camshaft, spark timing is not possible since the spark must be generated at very specific crank angles. Conversely, the actual injection timing of the fuel into the engine is less critical provided that the fuel injection precedes the spark by at least one-half crank revolution since the intake valves are closed during the compression stroke at the end of the intake stroke.

Additionally, in order to ensure fast engine startup, it is necessary to provide a relatively large amount of fuel to the engine during a startup condition. However, the injection of excess fuel to the engine which is uncombusted disadvantageously results in increased engine emissions. Such increased engine emissions may not meet governmental emission level requirements.

Consequently, in order to provide fuel to the engine during a startup condition and yet minimize undesirable engine emissions, there have been previously known cold start fuel injectors which provide the fuel charge to several or all of the combustion chambers for the engine during an engine startup condition. The cold start fuel injector injects sufficient fuel into a cold start fuel passageway open at its outlet to the air intake passageway to provide the fuel charge to the engine during engine warm up. As the engine warms up, the cold start fuel injector is gradually deactivated while, simultaneously, the multipoint fuel injectors are gradually activated in order to provide a smooth transition between the cold start fuel injector and the multipoint fuel injectors.

These previously known fuel control systems for the engines during engine startup, however, have suffered from a number of disadvantages. One such disadvantage is that it is necessary to provide an overly rich fuel mixture to the engine during a cold start engine condition in order to ensure proper engine starting. Many of the previously known systems which have a cold start fuel injector utilize electric heaters within the cold start fuel passageway to vaporize the fuel prior to its induction into the internal combustion engine. However, because it is necessary to provide a relatively large quantity of fuel in order to obtain the overly rich combustion charge to the engine combustion chambers to ensure smooth engine starting, in many cases, the fuel injected by the cold start fuel injector overly cools the electric heater. When this happens, unvaporized fuel is inducted into the engine combustion chambers during engine startup. Such unvaporized fuel disadvantageously increases noxious emissions from the engine in excess of those required by governmental emission regulations.

A still further disadvantage of these previously known fuel management systems during engine startup is that typically the cold start fuel injector is only activated once the engine attains a certain rotational speed, e.g. 70–100 rpm. When that rotational speed is obtained, the ECU begins activation of the cold start fuel injector. However, after this rotational speed is attained during engine cranking, the internal combustion engine must induct all of the air from the cold start fuel passageway before the actual air/fuel mixture from the cold start fuel injector actually reaches the internal combustion chambers of the engine and thus before actual fuel combustion can begin. This delay is known as the cold start fuel injector transport delay. In many cases, the delay can extend as long as eight combustion cycles for the engine.

A still further disadvantage associated with the cold start fuel injector transport delay is that, when the fuel charge from the cold start fuel passageway actually reaches the engine combustion chambers, only a partial air/fuel mixture is inducted into the engine combustion chamber during the first initial intake cycles for the engine. This partial fuel charge is typically insufficient to achieve engine combustion in the combustion chamber thus resulting in an uncombusted fuel charge in the engine exhaust. Such uncombusted fuel causes unacceptable engine emissions.

SUMMARY OF THE PRESENT INVENTION

The present invention provides an engine fuel control system for use at engine startup which overcomes the above-mentioned disadvantages of the previously known systems.

In brief, the fuel control system during engine startup of the present invention is preferably used with a conventional four-cycle internal combustion engine having multiple internal combustion chambers and of the type used for automotive vehicles. An air intake passageway has its inlet open to ambient air and its outlet open to the internal combustion chambers.

A piston is reciprocally mounted within each combustion chamber and is drivingly connected with a crankshaft which provides the power output from the engine. A crankshaft position sensor generates an output signal representative of the angular rotational position of the crankshaft to an engine control unit.

A camshaft is operatively associated with both the intake valves for the internal combustion chambers and, likewise, a camshaft is operatively associated with the exhaust valves for the internal combustion chambers. Both camshafts are driven in synchronism with each other and at a speed equal to one-half the rotational speed of the engine crankshaft. A camshaft position sensor detects the angular position of the camshaft and provides an output signal representative thereof to the ECU.

A multipoint fuel injector is associated with each combustion chamber and, when activated by the ECU, injects fuel into its associated combustion chamber. The actual amount of fuel injected by the multipoint fuel injector is controlled by its duration of activation. The ECU also controls the ignition timing of the spark plugs as well as other engine operating components.

Optionally, the internal combustion engine includes a cold start fuel injector which injects a fuel charge into an inlet end of a cold start fuel passageway. The outlet end of the cold start fuel passageway is fluidly connected to at least several, and oftentimes all, of the engine combustion chambers via the inlet valves. An electric heater is also preferably mounted within the cold start fuel passageway to enhance vaporization of the fuel injected by the cold start fuel passageway prior to its induction into the engine combustion chambers.

The ECU controls the timing and duration of activation of the multipoint fuel injectors, the cold start fuel injector if present, as well as the spark igniters. In its control of the multipoint fuel injectors and cold start injector, if present, the ECU provides one or more pulses to the multipoint fuel injectors and/or cold start fuel injector which opens a cold start fuel injector or multipoint fuel injector for the duration of the pulse. Consequently, the duration of the pulse from the ECU to the multipoint fuel injector and cold start fuel injector is directly proportional to the amount of fuel injected by the multipoint fuel injectors and cold start fuel injector, respectively.

The ECU also receives a number of input signals from various sensors in the engine. These sensors include the crankshaft position sensor as well as the camshaft position sensor. The ECU is then programmed to determine the synchronization of the engine in response to output signals from both the crankshaft position sensor as well as the output signal from the camshaft position sensor or, alternatively, the absence of an output signal from the camshaft position sensor where otherwise expected.

In operation, during an engine starting condition, the processing circuit monitors the engine speed. When the engine speed achieves a predetermined value, e.g. 70–100 rpm, the ECU initiates activation of the cold start fuel injector. Immediately following the activation of the cold start fuel injector, however, a fuel charge is not provided to any of the internal combustion engines by the cold start fuel injector since the pistons in the combustion chambers must first induct the air from the cold start fuel passageway due to the fuel charge transport delay in the cold start fuel passageway.

In order to obtain a fuel charge in the engine combustion chambers after the time of activation of the cold start fuel injector, after engine synchronization has been determined by the ECU from the crankshaft sensor output and camshaft sensor output (or absence thereof), the ECU determines which of the multiple combustion chambers is in its intake cycle and at an angular position sufficient to receive a full charge to initiate combustion. The ECU then activates the multipoint fuel injector for such combustion chambers for a duration sufficient to provide fuel to obtain a predetermined fuel charge within the combustion chamber in order to obtain engine ignition substantially simultaneously with activation of the cold start fuel injector.

During the succeeding intake cycles of the other internal combustion chambers, the ECU selectively determines the amount of fuel charge, if any, provided by the cold start fuel injector and then activates the multipoint fuel injector in an amount sufficient to obtain the predetermined air/fuel mixture in the combustion chamber when combined with the fuel charge from the cold start fuel injector. This process continues through as many intake cycles as required, typically corresponding to the number of cylinders within the engine, until the air within the cold start fuel passageway is completely purged or inducted by the engine pistons. When that occurs, the ECU deactivates the multipoint fuel injectors and relies primarily upon the cold start fuel injector to supply the fuel charge to the engine until engine warm up is achieved.

The use of a cold start fuel injector, however, is entirely optional. If omitted, the multipoint fuel injectors are selectively activated in the fashion described above after engine synchronization to provide the required fuel to the combustion chambers during, the engine warm up period.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
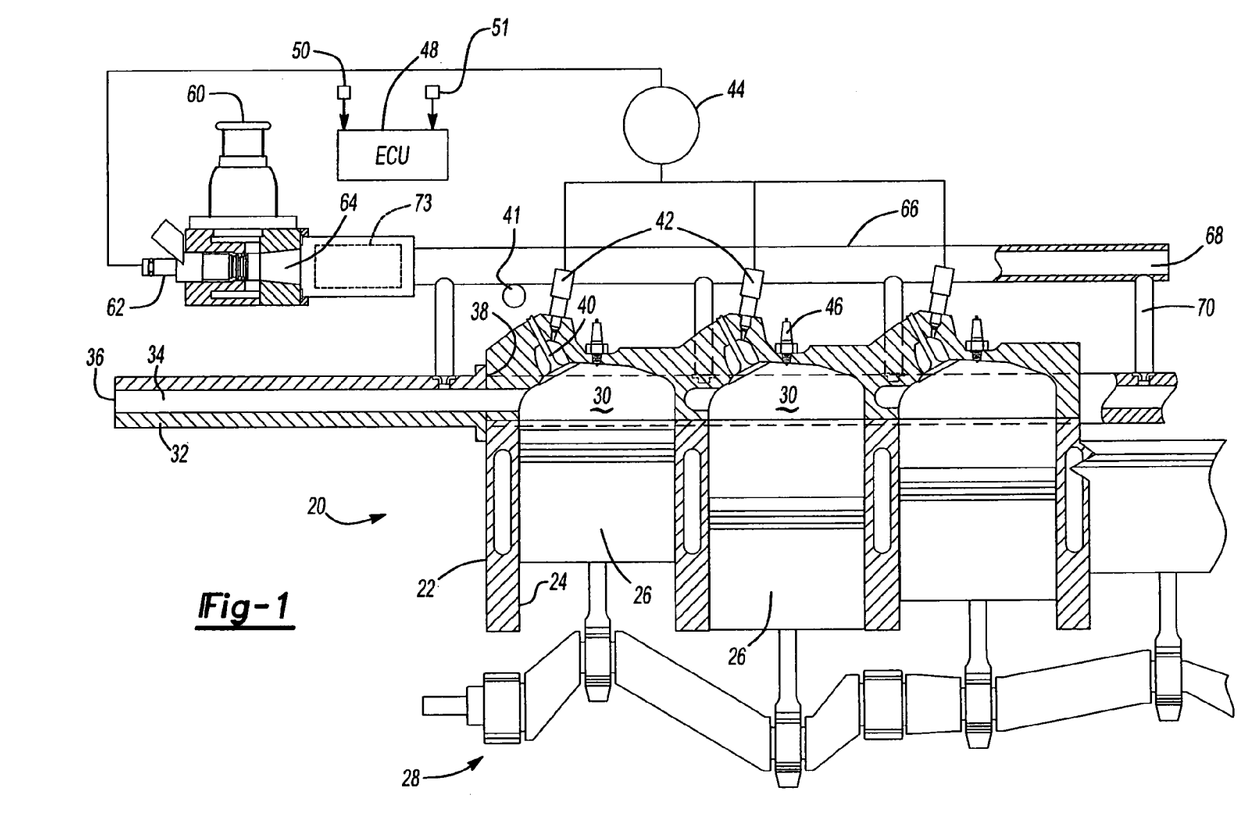
FIG. 1 is a block diagrammatic view illustrating a preferred embodiment of the present invention.

With reference first to FIG. 1, a portion of an internal combustion engine 20 is shown having an engine block 22 and a plurality of cylinders 24 formed within the engine block 22. A piston 26 is reciprocally slidably mounted within each cylinder 24 so that, upon reciprocation of the pistons 26 within their respective cylinders 24, they rotatably drive a main crankshaft 28 in the conventional fashion.

A combustion chamber 30 is formed between each piston 26 and its associated cylinder 24. An intake manifold 32 defining a main air intake passageway 34 has one end 36 open to ambient air while its other end 38 is fluidly connected to the combustion chambers 30 through a conventional intake valve 40 associated with each combustion chamber 30. Thus, upon reciprocation of the pistons 26 within their respective cylinders 24, the pistons 26 induct air through the main passageway 34 and into the combustion chamber 30 during the intake stroke of a four-cycle engine when the intake valve 40 is open.

A camshaft 41 is rotatably mounted to the engine 20 and operatively controls the actuation of the intake valves 40. Furthermore, since the engine 20 is a four-cycle engine, the camshaft 41 rotates at a speed equal to one-half the rotational speed of the crankshaft 28. A multipoint fuel injector 42 is associated with each combustion chamber 30. Each multipoint fuel injector 42 has an inlet fluidly connected to a source 44 of pressurized fuel (illustrated only diagrammatically) commonly known as a fuel rail. The output of each multipoint fuel injector 42 is open to its associated combustion chamber 30 so that, upon activation of the multipoint fuel injector 42, the multipoint fuel injector 42 injects fuel into the combustion chamber 30 of its associated cylinder 24. The amount of fuel injected by the multipoint fuel injector 42 during the intake strokes is proportional to the duration of activation of the multipoint fuel injector 42.

A spark igniter 46, such as a spark plug, is also associated with each combustion chamber 30 to ignite the combustible charge within the combustion chamber 30 during or slightly before the power stroke of the engine 20.

An electronic control unit 48 is operatively connected to all of the multipoint fuel injectors 42 as well as the spark igniters 46 to control the activation of both the multipoint fuel injectors 42 and spark igniters 46. In practice, the ECU generates an activation pulse to the multipoint fuel injectors 42 at the appropriate time which opens the multipoint fuel injectors 42 so that the multipoint fuel injectors 42 inject the fuel from the source 44 into their associated combustion chamber 30 for the duration of the activation pulse. The duration of the activation pulse from the ECU 48 thus determines the amount of fuel injected by each of the multipoint fuel injectors 42. The ECU 48 also activates the spark igniters 46 at the appropriate time.

The ECU 48 receives an input signal from a sensor 50 indicative of the crank angle position of the crankshaft 28. Additionally, the ECU 48 receives an input signal from a sensor 51 indicative of the rotational position of the camshaft 41. Typically, a gear wheel having a missing tooth is connected to the crankshaft 28 so that the sensor 50 detects the teeth on the gear wheel and detects the missing tooth by the absence of a signal. Similarly, a gear wheel having an indicator, such a; a single tooth, hole, depression or the like at a preset angular position, is rotatably driven in unison with the camshaft 41 so that the sensor 51 detects the indicator.

Alternatively, the camshaft sensor 51 may cooperate with a continuous position indicator mounted to, or driven by the camshaft 41 so that the output signal from the camshaft sensor 51 varies continuously throughout each revolution of the camshaft 41. In this case, the ECU 48 determines the rotational position of the camshaft 41, as well as synchronization of the camshaft 41 and crankshaft 28 essentially instantaneously from a single reading of the camshaft sensor 51.

Preferably, the angular position of the missing tooth as detected by the crankshaft position sensor 50 is offset from the output signal from the camshaft position sensor 51 by a predetermined amount, e.g. 10 degrees. Thus, for example, if an output signal from the camshaft position sensor is received 10 degrees after the missing tooth output signal from the crankshaft sensor, the ECU 48 can determine the stroke of each cylinder within the engine. Conversely, in the absence of the expected output signal from the camshaft sensor 51 following the receipt of the output signal from the crankshaft sensor 50 by the ECU 48, the ECU 48 can also determine the stroke and position of each piston within its combustion chamber. When the ECU 48 determines the stroke of each combustion chamber in this fashion, the ECU has determined the synchronization for the internal combustion engine.

Still referring to FIG. 1, a cold start fuel injector 60 has its inlet 62 connected to the pressurized fuel source 44. The ECU 48 controls the activation of the cold start fuel injector 60 by issuing a series of pulses to the cold start fuel injector 60. The amount of fuel injected by the cold start fuel injector 60 is proportional to the duration of each pulse.

An outlet 64 of the cold start fuel injector 60 is fluidly connected through a cold start fuel passageway 68 formed by a cold start manifold 66 to the intake of multiple combustion chambers 30. Preferably, a single cold start fuel injector 60 provides fuel during a cold start engine condition to all of the combustion chambers 30. Alternatively, multiple cold start fuel injectors 60 may be employed with each cold start fuel injector handling different cylinders.

Still referring to FIG. 1, the cold start manifold 66 is preferably fluidly connected by an individual runner 70 for each combustion chamber 60 so that each runner 70 is open to the main intake manifold passageway 34 immediately upstream from the intake valve 40 of its associated combustion chamber 30. Furthermore, the volume of the cold start passageway 68 is preferably much less than the volume of the main intake manifold 34 for a reason to be subsequently described.

In order to facilitate vaporization of the fuel from the cold start fuel injector 60, an electrically powered heater 73 is provided adjacent the outlet 64 of the cold start fuel injector 60. Such heaters 73 are conventional in construction and vaporize the fuel from the cold start fuel injector 60 to provide a more efficient combustion charge to the combustion chambers 30 during a cold start operating condition.

Figure 3:
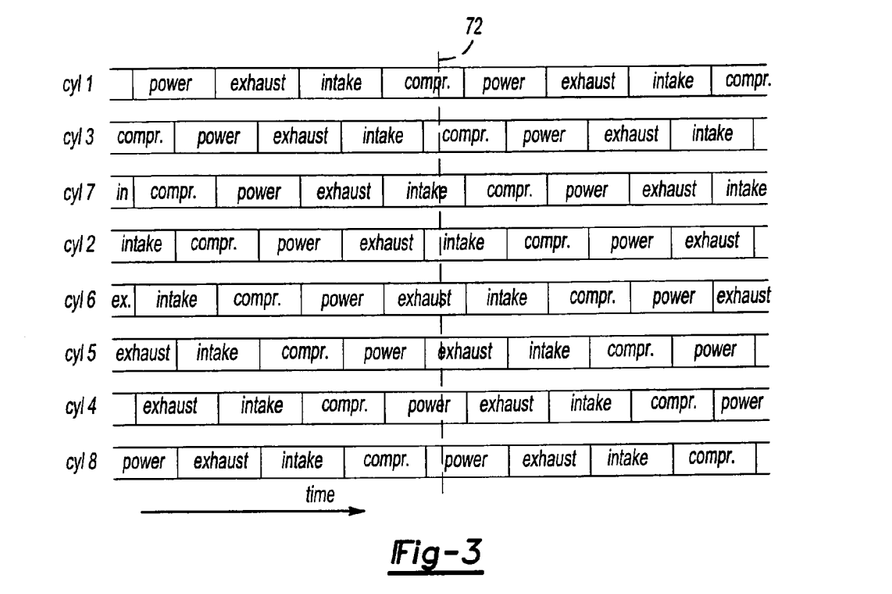
FIG. 3 is a diagrammatic view illustrating the cold start fuel injection system for an eight-cylinder engine.

With reference now to FIG. 3, an exemplary cylinder event chart for an eight-cylinder four-cycle engine is shown in which each engine cycle for each cylinder consists of the intake, compression, power and exhaust strokes. Each complete engine cycle, i.e. intake through exhaust cycle, requires two revolutions of the main shaft 28 (FIG. 1) in the conventional fashion.

During engine startup, the ECU 48 monitors the rotary speed of the main shaft 28 and initiates the activation of the cold start fuel injector 60 only after the rotary speed of the shaft 28 achieves a predetermined value, e.g. 70–100 rpm. For exemplary purposes, the initiation of the cold start fuel injector 60 is indicated at time 72 in FIG. 2.

Figure 2:
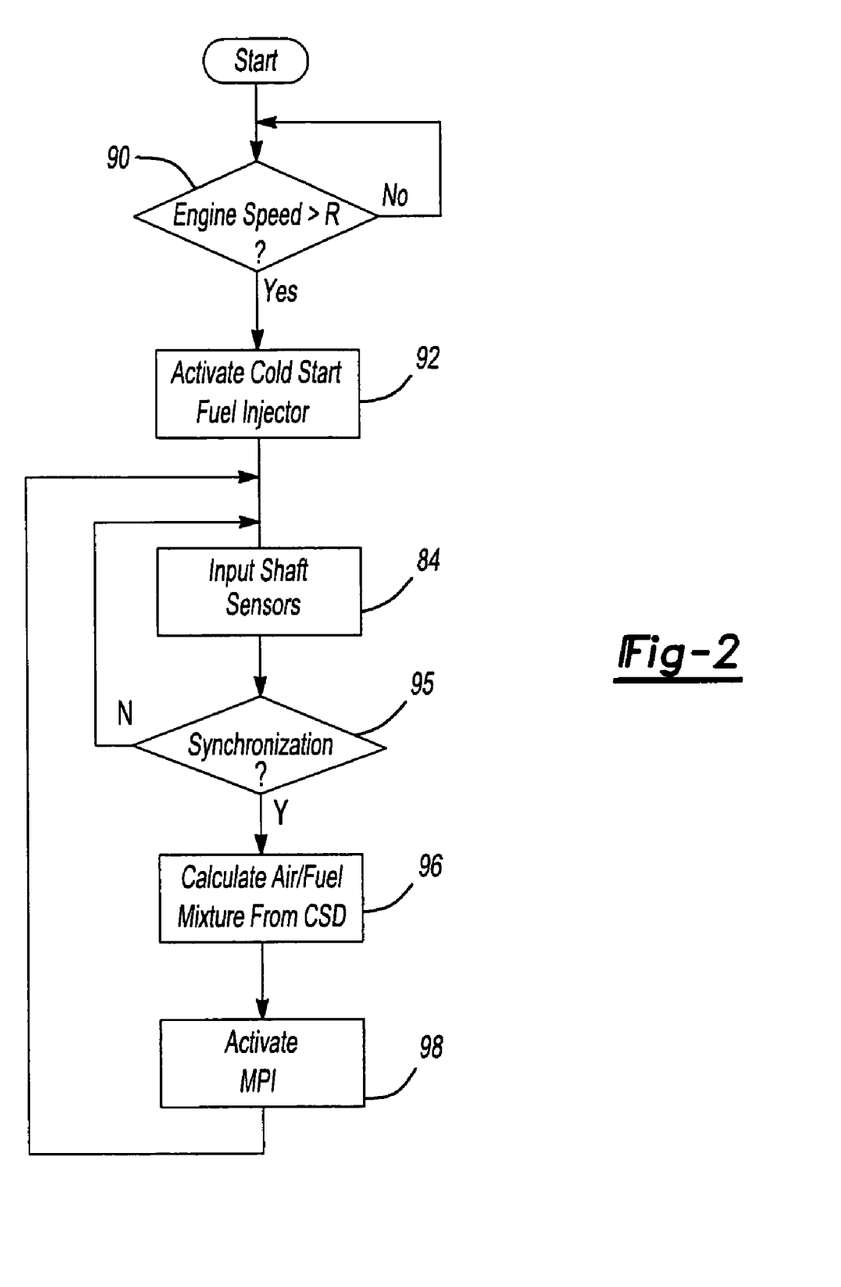
FIG. 2 is a cylinder event chart for an eight-cylinder engine.

With reference particularly to FIG. 2, at time 72, cylinder 7 is approximately 65% through its intake cycle while cylinder 2 is approximately 17% into its intake stroke. All other cylinders of the engine 20 are in different strokes of the engine cycle.

Figure 4:
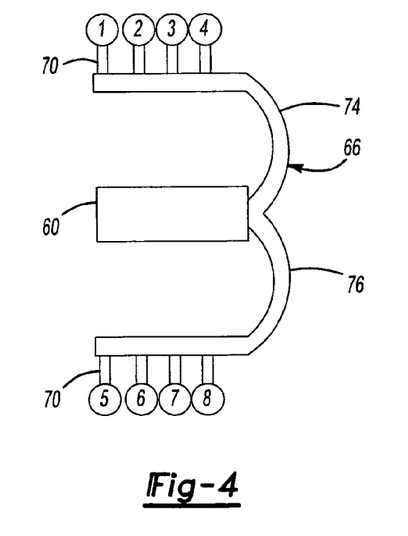
FIG. 4 is a flowchart illustrating a preferred embodiment of the present invention.

With reference now to FIG. 4, a schematic layout of the eight-cylinder engine 20 of the invention is shown in which the cold start manifold 66 is divided into two submanifolds 74 and 76. The submanifold 74 is fluidly connected to cylinders 1–4 through the runners 70 while the submanifold 76 is fluidly connected to the cylinders 5–8 through their respective runners 70. Thus, at time 72 (FIG. 3), i.e. at the initial activation of the cold start fuel injector 60, cylinder 7 inducts air from the submanifold 76 while, conversely, cylinder 2 inducts air from the submanifold 74 simultaneously with the initial injection of fuel by the cold start fuel injector 60 into the manifold 66.

During the initial activation of the cold start fuel injector 60 at time 72, the air/fuel charge from the c(old start fuel injector 60 has not yet reached either cylinder 2 or cylinder 7 (for the example shown) due to the transport delay of the air/fuel charge from the cold start fuel injector 60 through the submanifolds 74 and 76. In order to compensate for this transport delay from the cold start fuel injector 60 and to provide the desired fuel charge to the engine combustion chambers at engine startup, the ECU 48 selectively activates the multipoint fuel injectors to provide the fuel charge to the engine combustion chambers. However, the ECU 48 only activates the multipoint fuel injectors after the ECU 48 has determined the engine synchronization. By delaying activation of the multipoint fuel injectors until after engine synchronization has been determined, the ECU ensures that the multipoint fuel injectors are only activated for those combustion chambers in their intake stroke. Furthermore, the ECU activates the multipoint fuel injectors for the combustions that are in their intake stroke with a sufficient time period remaining on the intake stroke such that the multipoint fuel injector can provide an adequate fuel charge to that combustion chamber to ensure ignition.

Since the multipoint fuel injectors are only activated for those combustion chambers in their intake stroke and with a sufficient time of the intake stroke remaining to allow a sufficient fuel charge to be introduced into the combustion chamber, the fuel control system of the present invention ensures fast engine startup as well as complete combustion of the fuel charge within the engine. This, in turn, reduces noxious emissions from the engine.

With reference now to FIG. 2, a flowchart illustrating the operation of the present invention is shown. At step 90, the ECU monitors the engine rotary speed of the main shaft 28 to determine if the engine speed has achieved a predetermined value R. If not, step 90 continues to iterate until the predetermined engine speed R is achieved. Once the predetermined engine speed R has been achieved, step 90 branches to step 92.

At step 92 the ECU 48 activates the cold start fuel injector 60 and then proceeds to step 94. At step 94, the ECU inputs the signals from the crankshaft position sensor 50 as well as the signal from the camshaft sensor 51. Step 94 then proceeds to step 95.

At step 95, the ECU determines whether or not engine synchronization has been achieved, i.e. whether input signals have been received from the crankshaft position sensor 50 as well as a signal from the camshaft position sensor 51 or, alternatively, the absence of an expected signal from the camshaft position sensor 51. If synchronization has not been achieved, step 95 branches back to step 94 and iteratively inputs the signals from the sensors 50 and 51 until synchronization has been achieved. Once achieved, step 95 proceeds to step 96.

At step 96, the ECU 48 calculates the amount of the air/fuel mixture reaching the particular cylinder under the intake stroke by subtracting the total volume of the air within the cold start submanifolds 74 and 76 and associated runners 70 from the amount of air inducted by the engine from time 72. It is only after all of the air has been inducted by the engine from the submaniifolds 74 and 72 and runners 70 that the fuel charge from the cold start fuel injector 70 actually reaches the combustion chambers 30 of the engine 20. Step 96 then branches to step 98.

At step 98, the ECU 48 activates the multipoint fuel injector 42 associated with the combustion chambers 30 during the intake stroke to provide a predetermined air/fuel mixture, when combined with the air/fuel mixture from the cold start fuel injector 60, immediately following activation of the cold start fuel injector 60 at time 72. Step 98 then branches back to step 94 and iteratively calculates the necessary activation of the multipoint fuel injector 42 until all of the air in the cold start submanifolds 72 and 74 has been purged, i.e. inducted by the engine. At that time, the ECU deactivates the multipoint fuel injector and the cold start fuel injector 60 solely provides the fuel to the engine combustion chambers 30 until the conclusion of the engine warm up period.

For example, assuming that the engine is a 4.6-liter eight-cylinder that is activated during time 72 (FIG. 2), the volume inducted by each cylinder is equal to:

$$\frac{4.6 \text{ L}}{8} = 0.575 \text{ L/cylinder}$$

Assume further that each cold start submanifold 74 has a total volume of 0.5 liters per submanifold 74 or 76 and that each runner 70 has a total volume of 0.14 liters. Furthermore, as previously described, at time 72, the cylinder 7 has approximately 35% left of its intake stroke while cylinder 2 has approximately 83% left of its intake stroke. As such, the amount of air inducted by cylinder 7 from its submanifold 76 following time 72 is calculated as follows:

$$0.35 \times 0.575 \text{ L} = 0.2 \text{ L}$$

Of the 0.2 liters inducted by cylinder 7 following time 72, 0.14 liter is inducted from the runner 70 associated with cylinder 7 so that 0.06 liters of residual air is inducted from the submanifold 76.

Similarly, since cylinder 2 has approximately 83% left of its intake stroke following time 72, the amount of air inducted by cylinder 2 following time 72 is calculated as follows:

$$0.83 \times 0.575 \text{ L} = 0.48 \text{ L}$$

Of the 0.48 liters inducted by cylinder 2 following time 72, 0.14 liter is inducted from the runner 70 associated with cylinder 2 while the remaining 0.34 liter is inducted from the submanifold 74.

Figure 5:
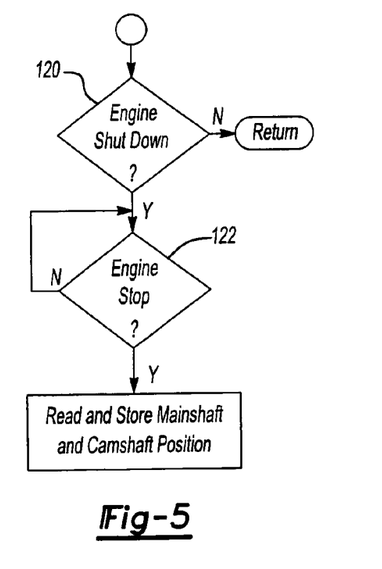
FIG. 5 is a flowchart illustrating a modification of the present invention.

Initially following time 72, absolutely no fuel from the cold start fuel injector 60 reaches the engine combustion chambers 30 for cylinders 7 and 2 through the intake cycle of cylinder 6 (see FIG. 2). Consequently, after absolute synchronization has been achieved, the ECU activates the multipoint fuel injectors 42 to provide The fuel, when combined with the fuel charge from the cold start fuel injector, ii any, necessary to achieve the desired air/fuel ratio in the cylinders. Thereafter, the fuel charge from the cold start fuel injector 60 begins to reach the engine combustion chambers 30. When this occurs, the amount of fuel supplied by the multipoint fuel injectors is diminished so that, when combined with the fuel charge provided by the cold start fuel injector, the predetermined air/fuel mixture for the combustion chamber is achieved. In practice, one full intake cycle of each cylinder is necessary in order to not only purge all of the air from the submanifolds 72 and 74, but also from all of the runners 70 associated with the combustion chambers 30. A table depicting the fuel provided by the multipoint fuel injectors and cold start fuel injector 60 is summarized for the example shown in the table below:

position of the main shaft 28 and/or camshaft 41 until the main shaft 28 and/or camshaft 41 cease rotation. When this occurs, step 122 branches to step 124.

Step 124 then stores; the angular position of both the main shaft 28 and/or camshaft 41 in a digital memory storage means 126 (FIG. 1) such as flash memory, EPROM and/or the like. Thereafter, upon a subsequent engine startup, the ECU 48 determines engine synchronization by reading the stored angular position values of the main shaft 28 and/or camshaft 41 just prior to engine cranking.

Although the present invention has been described for use in conjunction with a cold start fuel injector and in which the multipoint fuel injectors, after engine synchronization by the ECU, supplement the fuel charge to the engine, it should be understood that the use of the cold start fuel injector is optional. In this case, the multipoint fuel injectors will provide the entire combustible charge to the engine combustion chambers during an engine start condition. However, regardless of whether the system includes the cold start fuel injector or not, activation of the multipoint fuel injectors is not initiated until after engine synchronization has been determined by the ECU.

From the foregoing, it can be seen that the present invention provides a simple and yet highly effective fuel control system for an engine for use during engine startup. Having described my invention, however, many modifications thereto will become apparent to those skilled in the art

| Cyl. | Charge Volume (since CSD starts) ltr | Residual Air Induced From Runner ltr | From Manifold 74 ltr | From Manifold 76 ltr | Air/Fuel Induced ltr | Approx. Charge Composition Air Only (%) | Air/Fuel (%) | Remaining Residual Air in Fuel Manifold Manifold 74 init: 0.5 ltr | Manifold 76 init: 0.5 ltr |
|---|---|---|---|---|---|---|---|---|---|
| 7 | 0.20 | 0.14 |  | 0.06 | 0 | 100 | 0 |  | 0.44 |
| 2 | 0.48 | 0.14 | 0.34 |  | 0 | 100 | 0 | 0.16 |  |
| 6 | 0.575 | 0.14 |  | 0.435 | 0 | 100 | 0 |  | 0.005 |
| 5 | 0.575 | 0.14 |  | 0.005 | 0.43 | 25 | 75 |  | 0 |
| 4 | 0.575 | 0.14 | 0.16 |  | 0.275 | 52 | 48 | 0 |  |
| 8 | 0.575 | 0.14 |  |  | 0.435 | 24 | 76 |  |  |
| 1 | 0.575 | 0.14 |  |  | 0.435 | 24 | 76 |  |  |
| 3 | 0.575 | 0.14 |  |  | 0.435 | 24 | 76 |  |  |
| 7 | 0.575 |  |  |  | 0.575 | 0 | 100 |  |  |
| 2 | 0.575 |  |  |  | 0.575 | 0 | 100 |  |  |

By providing additional fuel from the multipoint fuel injectors following time 72, the present invention ensures that sufficient fuel is provided to the engine combustion chambers 30 to enable engine combustion. This, in turn, leads to better emission levels from the engine since, unlike the previously known engines, the likelihood of uncombusted fuel exhausted from the engine is eliminated or at least minimized. It will be understood, of course, that the calculated fuel values may be empirically modified to compensate for actual engine conditions.

With reference now to FIG. 5. a flowchart illustrating a modification of the present invention is shown. At step 120 whenever the ECU 48 detects an engine shutdown condition, step 120 branches to step 122 which monitors the to which it pertains without deviation from the spirit of the invention as defined by the scope of the appended claims.

The invention claimed is:

1. An engine startup fuel control system for use with an internal combustion engine of the type having at least one combustion chamber, an intake air passage fluidly connected each combustion chamber, a source of fuel, a crankshaft and a camshaft, said fuel control system comprising:
   a multipoint fuel injector associated with each combustion chamber, each multipoint fuel injector having an inlet connected to said fuel source and an outlet fluidly connected to said intake air passageway adjacent its associated combustion chamber,
   a crankshaft position sensor which generates an output signal representative of the angular position of the crankshaft, a camshaft position sensor which generates an output signal representative of the angular position of the camshaft, an engine control unit programmed to determine the synchronization of the engine in response to said output signals from said crankshaft position sensor and said camshaft position sensor, said engine control unit having outputs which control the activation of each said multipoint fuel injector, said engine control unit programmed to calculate the amount of fuel to achieve a predetermined air/fuel mixture for each cylinder and to vary the activation of each said multipoint fuel injector after the determination of engine synchronization after initiation of camshaft rotation to achieve said predetermined air/fuel mixture in each of said combustion chambers.

2. The invention as defined in claim 1 and comprising a cold start fuel injector having an inlet connected to said fuel source and an outlet fluidly connected through a cold start passageway with each combustion chamber, said engine control unit having an output which controls the activation of said cold start fuel injector.

3. The invention as defined in claim 2 wherein said ECU determines the air/fuel mixture introduced by said cold start fuel injector into each combustion chamber during startup.

4. The invention as defined in claim 1 wherein the engine control unit is programmed to begin activation of said multipoint fuel injectors only after a predetermined rotary speed of the main shaft during engine startup.

5. The invention as defined in claim 1 and comprising means for storing said crankshaft position sensor output signal and said camshaft position sensor output signal in memory storage means at engine shutoff.

6. The invention as defined in claim 5 wherein said engine control unit determines synchronization of the engine by reading said stored crankshaft position sensor output signal and said stored camshaft position sensor output signal from said memory storage means.

7. The invention as defined in claim 1 wherein said internal combustion engine is a four-cycle internal combustion engine.

8. An engine startup fuel control system for use with an internal combustion engine of the type having at least one combustion chamber, an intake air passage fluidly connected each combustion chamber, a cold start fuel passageway having an inlet and an outlet, the cold start fuel passageway outlet being fluidly connected to the combustion chambers and a source of fuel, said fuel control system comprising:

a crankshaft position sensor which generates an output signal representative of the angular position of the crankshaft, a camshaft position sensor which generates an output signal representative of the angular position of the camshaft, a multipoint fuel injector associated with each combustion chamber, each multipoint fuel injector having an inlet connected to the fuel source and an outlet fluidly connected to said intake air passageway adjacent its associated combustion chamber, each said multipoint fuel injector, upon activation, injecting fuel into its associated combustion chamber, a cold start fuel injector having an inlet connected to said fuel source and an outlet fluidly connected to the inlet of the cold start fuel passageway, said cold start fuel injector, upon activation, introducing a fuel charge into the inlet of the cold start fuel passageway, processing means programmed to calculate the amount of fuel to achieve a predetermined air/fuel mixture for each cylinder and to determine the synchronization following initiation of camshaft rotation of the engine in response to said output signals from said camshaft sensor and said camshaft sensor and for producing said programmed air/fuel combustible charge in each combustion chamber during engine startup by selective activating said multipoint fuel injector during engine startup and after engine synchronization to provide fuel to each combustion chamber sufficient to compensate for any transport delay of the fuel charge from the cold start fuel injector through the cold start fuel passageway.

9. The invention as defined in claim 8 wherein said processing means initiates activation of said cold start fuel injector and said multipoint fuel injectors at a predetermined rotational speed of said main shaft.

10. The invention as defined in claim 8 and comprising means for storing said crankshaft position sensor output signal and said camshaft position sensor output signal in memory storage means at engine shutoff.

11. The invention as defined in claim 10 wherein said engine control unit determines synchronization of the engine by reading said stored crankshaft position sensor output signal and said stored camshaft position sensor output signal from said memory storage means.

12. The invention as defined in claim 8 wherein said internal combustion engine is a four-cycle internal combustion engine.

13. A method for managing fuel delivery in an internal combustion engine having multiple combustion chambers during engine startup, said engine having a crankshaft, a camshaft and a multipoint fuel injection associated with each combustion chamber, said method comprising the steps of:

determining the angular position of the crankshaft after initiation of crankshaft rotation, determining the angular position of the camshaft, thereafter calculating the required activation of the multipoint fuel injectors to achieve a predetermined air/fuel mixture in each said combustion chamber as a function of the angular position of said crankshaft and crankshaft, and thereafter selectively activating said multipoint fuel injectors in response to said calculating step to achieve said predetermined air/fuel mixture in each said combustion chamber.

14. The invention as defined in claim 13 and comprising the steps of storing said angular position of said crankshaft and said camshaft in memory storage means at engine shutdown.

15. The invention as defined in claim 14 wherein said calculating step comprises the step of reading said stored angular positions from said memory storage means.

16. The invention as defined in claim 13 wherein the internal combustion engine includes a cold start fuel injector and comprising the step of activating the cold start fuel injector after the engine crankshaft exceeds a predetermined rotary speed.

17. The invention as defined in claim 13 wherein said activating step comprises the step of activating the multipoint injectors during an intake stroke of the combustion chamber.

18. The invention as defined in claim 13 wherein the engine includes a cold start fuel injector and comprising the step of activating the cold start fuel injector when the rotational speed of the engine exceeds a predetermined amount.

* * * * *